(12) United States Patent
Ritoper et al.

(10) Patent No.: US 10,502,320 B2
(45) Date of Patent: Dec. 10, 2019

(54) SPRING RETAINER SEAL

(71) Applicant: Rohr, Inc., Chula Vista, CA (US)

(72) Inventors: Bryan D. Ritoper, San Diego, CA (US); Kushal H. Patel, San Diego, CA (US); Jesse E. Turner, San Diego, CA (US); Michael Aten, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 677 days.

(21) Appl. No.: 14/842,570

(22) Filed: Sep. 1, 2015

(65) Prior Publication Data
US 2016/0061328 A1    Mar. 3, 2016

Related U.S. Application Data

(60) Provisional application No. 62/044,726, filed on Sep. 2, 2014.

(51) Int. Cl.
| | | |
|---|---|---|
| *F16J 15/06* | (2006.01) | |
| *F16J 15/10* | (2006.01) | |
| *F16J 15/12* | (2006.01) | |

(52) U.S. Cl.
CPC .......... *F16J 15/065* (2013.01); *F16J 15/104* (2013.01); *F16J 15/128* (2013.01)

(58) Field of Classification Search
CPC ...... F16J 15/065; F16J 15/104; F16J 15/0893; F16J 15/027
See application file for complete search history.

(56) References Cited

U.S. PATENT DOCUMENTS

| | | | |
|---|---|---|---|
| 3,259,383 A | | 7/1966 | Johnson |
| 3,869,132 A | * | 3/1975 | Taylor .................... F16J 15/002 277/608 |
| 3,934,889 A | * | 1/1976 | Smith ...................... F02C 7/25 277/646 |
| 4,022,948 A | * | 5/1977 | Smith ...................... F02K 1/805 239/265.39 |
| 4,406,459 A | * | 9/1983 | Davis ................... F16J 15/3404 277/401 |
| 4,583,750 A | * | 4/1986 | Chabala ................. F16J 15/065 277/639 |
| 4,775,038 A | | 10/1988 | Unnikrishnan |
| 5,032,441 A | * | 7/1991 | Ten Eyck .............. F01N 3/0211 428/194 |

(Continued)

OTHER PUBLICATIONS

Parker.com, "Conductive Elastomer Overmolded Solutions", AN 1008 EN, May 2012, available at: <http://vendor.parker.com/852568C80043FA7A/468ea5de5ac341d385257d39005641c7/DF7F1823B60828D185257A290066873E/$FILE/Conductive%20Elastomer%20OverMolded%20Solutions.pdf>.

(Continued)

*Primary Examiner* — Eugene G Byrd
(74) *Attorney, Agent, or Firm* — O'Shea Getz P.C.

(57) ABSTRACT

Aspects of the disclosure are directed to a system for isolating at least one of a fire zone and a high-pressure zone from at least one of a non-fire zone and a low-pressure zone, comprising a seal and a flexible spring retainer coupled to the seal that is configured to bias the seal. The biasing may be based in terms of a compression of the seal within a predetermined range of compression. A shielding of the seal from the at least one of the fire zone and the high-pressure zone may be provided.

12 Claims, 5 Drawing Sheets

(56) References Cited

U.S. PATENT DOCUMENTS

| | | | | |
|---|---|---|---|---|
| 5,083,932 A * | 1/1992 | Wyatt | ............... | F23Q 7/001 |
| | | | | 439/126 |
| 5,226,788 A | 7/1993 | Fledderjohn | | |
| 5,251,917 A * | 10/1993 | Chee | ............... | B64D 27/00 |
| | | | | 244/129.1 |
| 5,458,343 A | 10/1995 | Dornfeld | | |
| 5,622,438 A | 4/1997 | Walsh | | |
| 9,382,808 B2 * | 7/2016 | Hodgkinson | ......... | F16J 15/027 |
| 9,618,123 B2 * | 4/2017 | Pretty | ............... | F16J 15/104 |
| 9,835,090 B2 * | 12/2017 | Exner | ............... | F02C 7/28 |
| 2003/0057655 A1 * | 3/2003 | Chehab | ............ | F16J 15/008 |
| | | | | 277/500 |
| 2006/0061047 A1 * | 3/2006 | Mullally | ............. | F16J 15/024 |
| | | | | 277/647 |
| 2009/0079141 A1 * | 3/2009 | Qiang | ............... | F16J 15/027 |
| | | | | 277/650 |
| 2009/0212504 A1 * | 8/2009 | Chila | ............... | F01D 9/023 |
| | | | | 277/628 |
| 2010/0044466 A1 * | 2/2010 | Vauchel | ............ | F01D 11/005 |
| | | | | 239/265.11 |
| 2012/0260579 A1 | 10/2012 | DeMello | | |
| 2013/0269262 A1 * | 10/2013 | Siegel | ............... | B60R 13/08 |
| | | | | 49/492.1 |
| 2014/0075948 A1 * | 3/2014 | Exner | ............... | F02C 7/25 |
| | | | | 60/726 |
| 2014/0262358 A1 * | 9/2014 | Livingston | ........ | A62C 3/08 |
| | | | | 169/45 |
| 2014/0345199 A1 * | 11/2014 | Yahata | ............... | B64C 1/14 |
| | | | | 49/475.1 |
| 2015/0233261 A1 * | 8/2015 | Hodgkinson | ......... | F01D 11/005 |
| | | | | 277/594 |

OTHER PUBLICATIONS

Federal Register, vol. 78, No. 87, Rules and Regulations, May 6, 2013, available at: <http://www.gpo.gov/fdsys/pkg/FR-2013-05-06/html/2013-08992.htm>.

* cited by examiner

SPRING RETAINER SEAL

CROSS-REFERENCE TO RELATED APPLICATION(S)

This application claims priority to U.S. Patent Appln. No. 62/044,726 filed Sep. 2, 2014.

BACKGROUND

Fire seals are used to isolate fire zones. Fire zones include any area that contains both a fuel and ignition source, such as an engine core. In such an environment, fuels, oils, or other volatile matter may ignite in connection with an ignition source. This can potentially affect the aircraft's ability to maintain safety of flight, unless adequate measures are taken to mitigate such risk and the spread of fire. Consequently, robust fire seals are often used to help form the barrier (fire-wall) required to separate such fire zones from adjacent structures. Fire proof sealing is used to mitigate fire risk.

In the context of aviation, the United States' Federal Aviation Administration (FAA) has defined fire proof sealing as being able to withstand a two-thousand degree Fahrenheit (2000° F.) flame for fifteen minutes (15 min). The sealing is frequently implemented using rubber "omega" seals or metallic "finger" seals. These seals compress when, e.g., a thrust reverser of an aircraft is closed. Design constraints that are used in the selection of a seal include a force required to compress the seal, an operating temperature of the seal, a weight of the seal, and a range of deflections that a seal can accommodate. As the size (e.g., diameter) of a seal increases, the amount of force required to compress the seal generally increases. Furthermore, larger seals are subject to an increased risk of instability (e.g., folding over) relative to smaller seals, and as a result, it might not be possible to maintain a sealing capability during exposure to direct flame and high pressure.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system for isolating at least one of a fire zone and a high-pressure zone from at least one of a non-fire zone and a low-pressure zone, comprising: a seal; and a flexible spring retainer coupled to the seal that is configured to bias the seal. In some embodiments, at least a portion of the seal is configured in a shape of a bulb. In some embodiments, the shape of the bulb comprises a complete bulb. In some embodiments, the bulb is integrated with an elastomer backing that couples to the spring retainer. In some embodiments, the spring retainer is configured to interface with the at least one of the fire zone and the high-pressure zone. In some embodiments, the spring retainer is configured to substantially shield the seal from the at least one of the fire zone and the high-pressure zone. In some embodiments, the spring retainer is feathered so as to include at least one slot. In some embodiments, the system comprises an elastomer that over-molds the spring retainer. In some embodiments, the system comprises a sheet of metal comprising at least one slot that is overlapped with the spring retainer such that the at least one slot in the sheet of metal does not coincide with the at least one slot of the spring retainer. In some embodiments, the seal is configured to couple to a pylon of a thrust reverser. In some embodiments, the spring retainer is configured to couple to a seal retainer of a thrust reverser. In some embodiments, the spring retainer and the seal retainer are a common piece of sheet metal. In some embodiments, the spring retainer is configured to principally act or respond to accommodate most of a deflection caused by an opening or closing of a thrust reverser, wherein the seal is configured to provide any additional action or response that is needed in accommodating the deflection.

Aspects of the disclosure are directed to a system comprising: a bulb seal integrated with an elastomer backing; and a metal feathered spring retainer coupled to the elastomer backing such that the elastomer backing over-molds a plurality of slots included in the spring retainer, wherein the spring retainer is configured to: bias the seal in terms of a compression of the seal within a predetermined range of compression, interface with at least one of a fire zone and a high-pressure zone, and substantially shield the seal from the at least one of the fire zone and the high-pressure zone.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
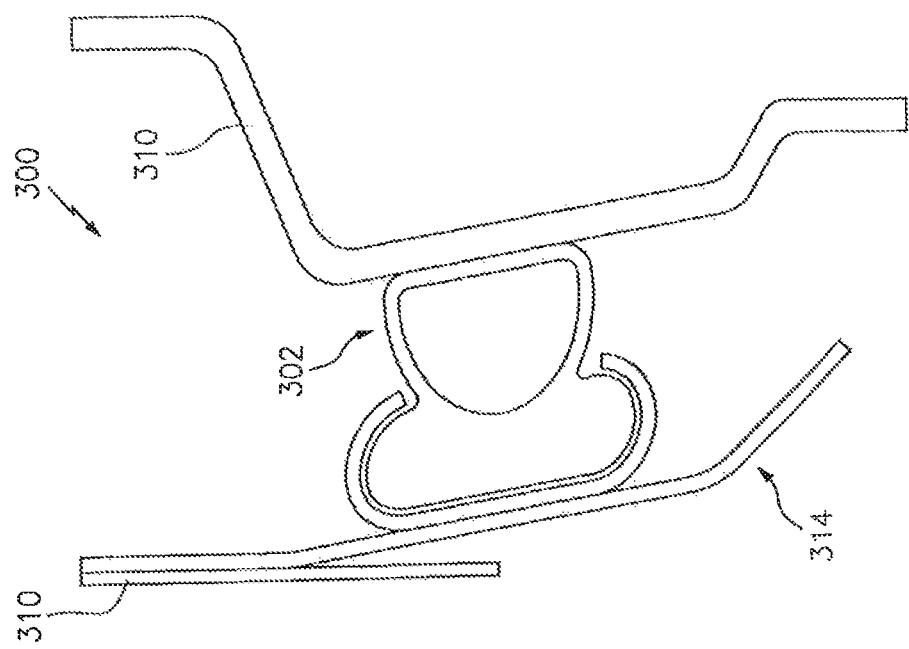
FIGS. 1A-1B illustrate a system incorporating a bulb seal and a spring retainer.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for making and using a spring retainer seal. In some embodiments, a spring retainer may be used to share deflections with a seal, such as an omega type bulb seal. As the distance between two seal interfaces decreases, the seal may exert a compressive force on the spring causing the spring to deflect. If the distance between the two seal interfaces increases, the spring may deflect extending the range of deflections the seal can accommodate.

Figure 1B:
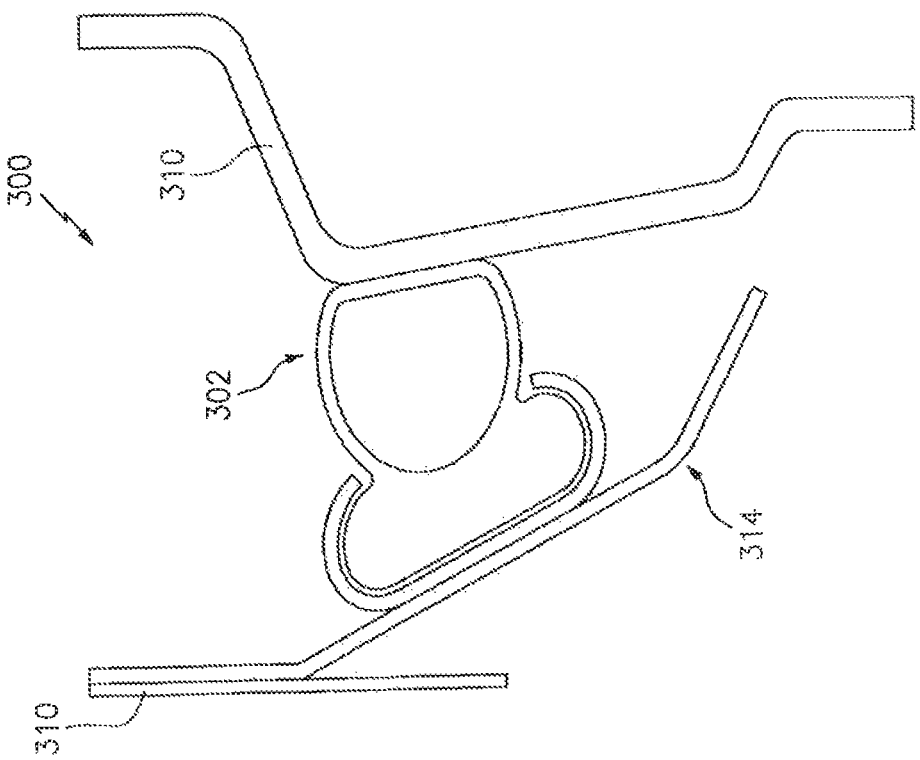

FIGS. 1A-1B illustrate a system 300 in two states, as described further below. The system 300 includes a seal 302 and a spring retainer 314. The seal 302 may be used to couple or interface two or more bodies 310. The spring retainer 314 may be composed of one or more materials, such as one or more metals or sheets of metal.

In FIG. 1A, the seal 302 is in a minimum/low compression or uncompressed state. In FIG. 1B, the seal 302 is in a maximum/high compression or compressed state. The state that the seal resides in may be a function of the distance between the bodies 310, where a change in the distance may be caused by one or more deflections.

Figure 1C:
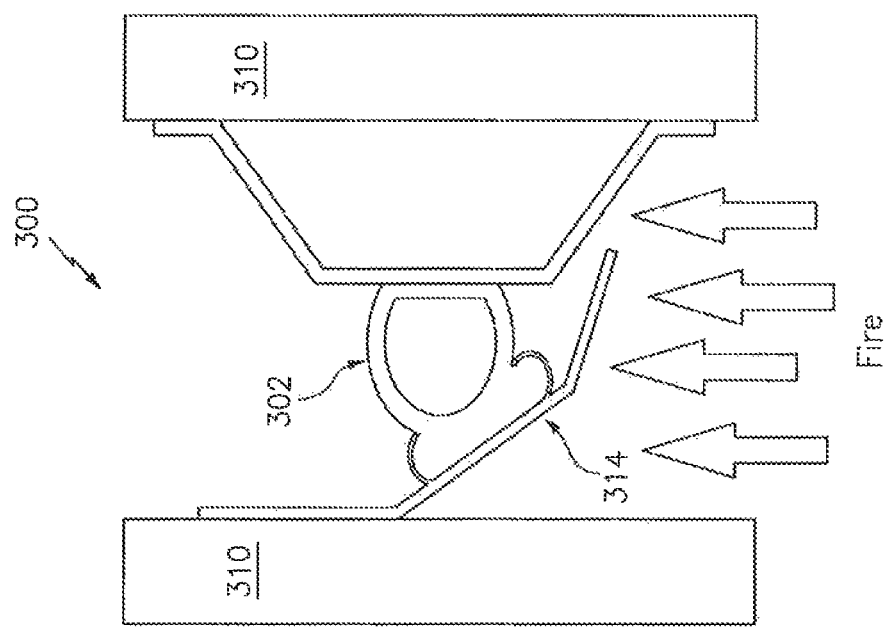
FIG. 1C illustrates a system incorporating a bulb seal and a spring retainer that serves as a shield to the presence of fire or pressure.

FIG. 1C illustrates the system 300 in the presence of fire. As shown, the spring 314 may substantially shield the seal 302 with respect to the fire or fire zone by isolating the seal 302 from the fire or fire zone. More generally, in accordance with aspects of the disclosure at least one of a fire zone and a high-pressure zone may be isolated from at least one of a non-fire zone and a low-pressure zone.

One or more of the systems described herein (e.g., system 300) may be designed with a goal of minimizing/reducing closing forces (e.g., thrust reverser closing forces) while keeping a seal (e.g., seal 302) within a predetermined compression range. For example, the predetermined compression range may correspond to approximately 25%-50% of a seal bulb diameter. The spring 314 may help to keep the seal 302 within the predetermined compression range or may help to reduce the limits of the compression range of seal 302 to be closer to the nominal compression value of the seal 302. In some embodiments, the spring 314 may principally act or respond to accommodate most of a deflection (e.g., more than a threshold amount, such as more than 50%), and then any additional action or response that is needed to accommodate the deflection may be provided by the seal 302.

Figure 2:
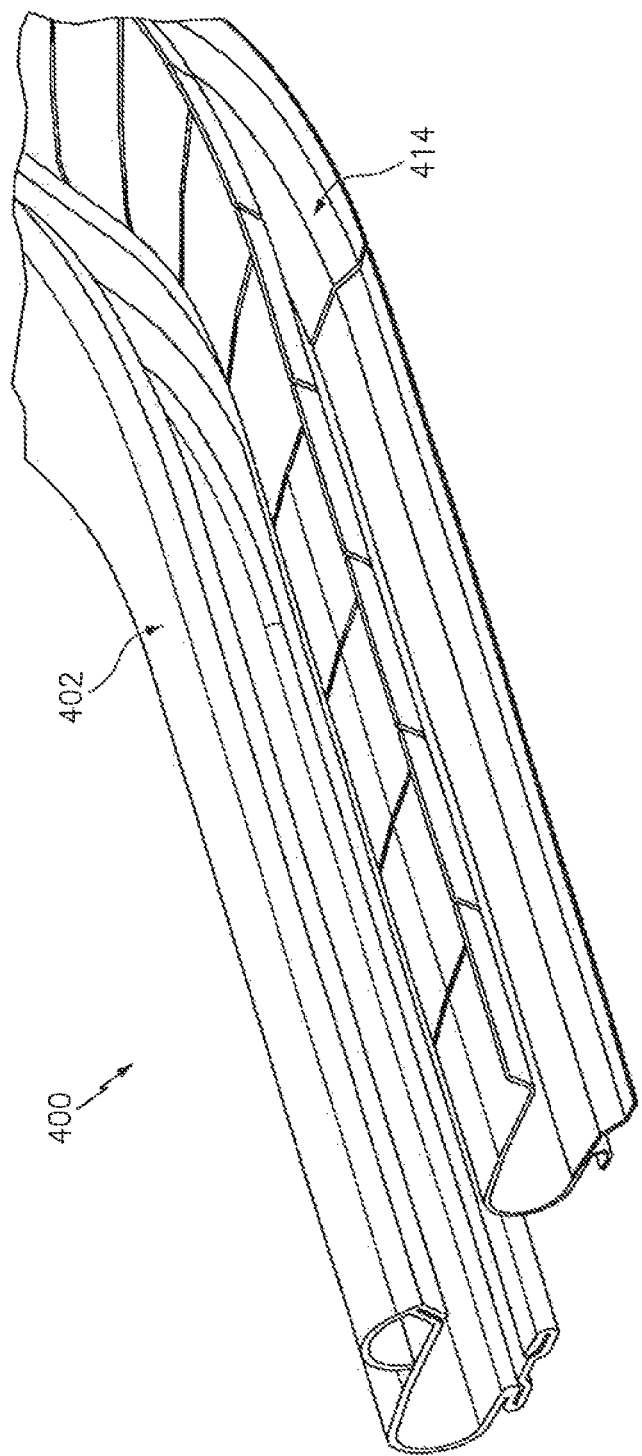
FIG. 2 illustrates a system incorporating a feathered spring in conjunction with a seal.

In some embodiments, a spring (e.g., spring 314) may be feathered in one or more sections to reduce stiffness and accommodate irregular shapes or curvature, such as a curvature associated with one or more bodies (e.g., bodies 310). The curvature may occur in more than one dimension (e.g., the curvature may occur in three dimensions). The feathering may include an incorporation of one or more slots in the spring in order to provide flexibility. A system 400 that includes a feathered spring 414 in conjunction with a seal 402 is shown in FIG. 2.

Figure 3:
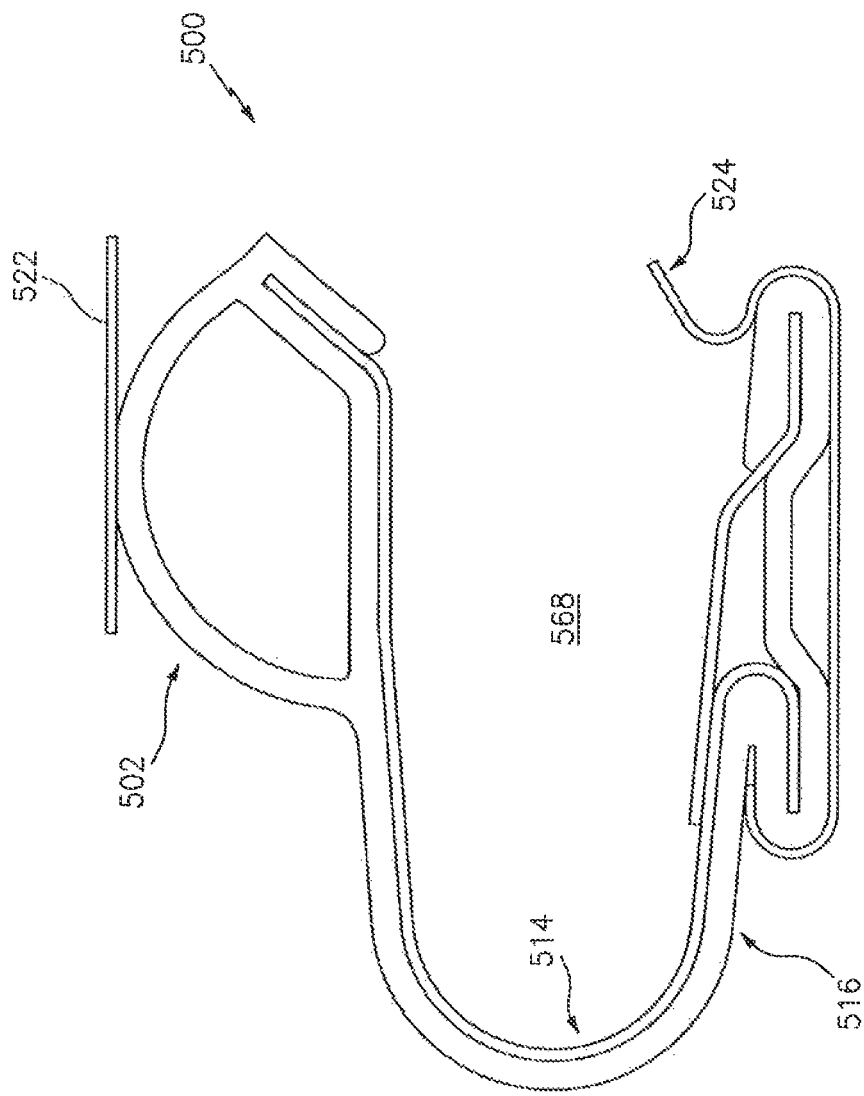
FIG. 3 illustrates a system incorporating an elastomer backing with an integrated seal, a spring retainer, a pylon, and a seal retainer.

Referring to FIG. 3, a system 500 is shown. The system 500 may correspond to the system 400. For example, the system 500 may represent a profile view of the system design 400, which is shown in an isometric view.

The system 500 may include an elastomer backing 516 that is provided with an integrated bulb seal 502 in order to seal section separations and provide a pliable interface to seal. The elastomer backing 516 may be used to provide for sealing capabilities beyond merely fire, such as sealing with respect to air or fluids. The elastomer backing 516 may couple to a spring 514. The spring 514 may interface with a fire zone 568, although in some embodiments, the elastomer backing 516/bulb 502 may interface with the fire zone 568. The bulb seal 502 may couple to a pylon 522. The elastomer backing 516 may couple to a seal retainer 524. In some embodiments, one or more fasteners may be used to couple the elastomer backing 516 to the seal retainer 524. The geometries or shapes of the elastomer backing 516 and the seal retainer 524 may be selected to minimize, or even preclude, the use of fasteners. For example, the elastomer backing 516 may simply slide into the seal retainer 524 via the application of pressure/force between the elastomer backing 516 and the seal retainer 524. In some embodiments, the elastomer backing 516 and/or the seal retainer 524 may be configured to hold the spring/seal system in place, while accommodating the use of fasteners to mount the seal retainer 524 on adjacent structures.

While shown as separate material pieces in FIG. 3, in some embodiments the spring 514 and seal retainer 524 may be fabricated as a single, common piece of material (e.g., sheet metal). The pylon 522 and/or the seal retainer 524 may correspond to part of the structure of a thrust reverser in some embodiments.

In some embodiments, a spring (e.g., spring 514) may be completely over-molded with elastomer (e.g., elastomer 516). Such over-molding may be used to compensate for any slots in the spring, such as slots created due to feathering. Alternatively, a so-called "turkey feathers" approach may be used. In the turkey feathers approach, two sets or sheets of metal that have slots in them may be overlapped with one another in such a way that a slot from a first set of the metals does not overlap or coincide with a slot from a second set of the metals. Thus, to the extent that the spring has slots in it, a (second) sheet of metal with slots may be overlaid or overlapped with the spring. The turkey feathers approach may be useful in embodiments where elastomers cannot be used, such as in applications or environments characterized by elevated temperatures (e.g., temperatures higher than a safe operation rating associated with elastomer).

Aspects of the disclosure may be used to accommodate a broad range of deflections without increasing the size of a (bulb) seal. Accordingly, the deflection range may be accommodated without having to increase an amount of applied sealant force that is required and without increasing the likelihood of seal failure. A spring or spring retainer may be used to compensate for any deficiency that might otherwise have occurred in using a small bulb seal, such that the bulb seal can be operated over an ideal or optimal range in terms of a compression of the bulb seal. The spring or spring retainer may be used to bias the (bulb) seal in terms of the seal's position or (degree of) compression.

Figure 4:
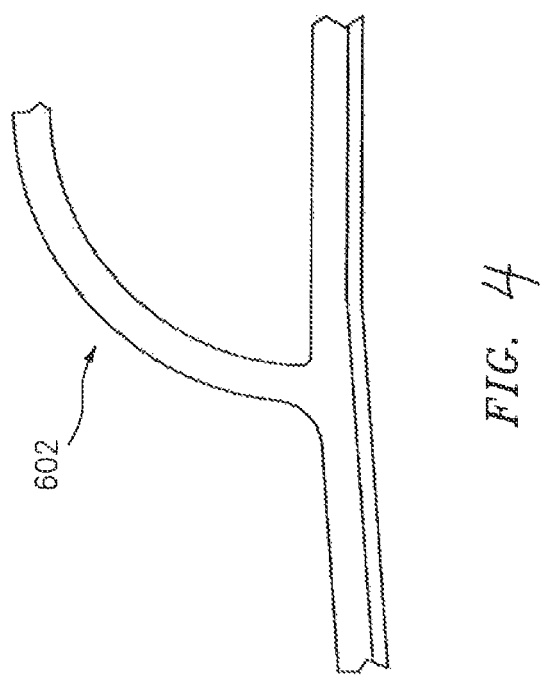
FIG. 4 illustrates a seal that includes merely a portion of a complete bulb.

While some of the example seals described herein include a complete or fully sealed bulb, some seals might not include a complete or fully sealed bulb. For example, a seal in accordance with aspects of this disclosure might only include a portion of a complete bulb, such as the seal 602 of FIG. 4. Various seal configurations and geometries may be used.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A system for isolating at least one of a fire zone and a high-pressure zone from at least one of a non-fire zone and a low-pressure zone, comprising:
   a seal, at least a portion of the seal configured in a shape of a bulb; and
   a flexible spring retainer coupled to the seal that is configured to bias the seal;
   the flexible spring retainer comprising a cantilevered spring element and a retainer element and
   a second portion of the seal positioned between and physically separating the cantilevered spring element from the retainer element.

2. The system of claim 1, wherein the bulb is integrated with an elastomer backing that couples to the spring retainer.

3. The system of claim 1, wherein the spring retainer is configured to interface with the at least one of the fire zone and the high-pressure zone.

4. The system of claim 3, wherein the spring retainer is configured to substantially shield the seal from the at least one of the fire zone and the high-pressure zone.

5. The system of claim 1, wherein the spring retainer is feathered so as to include at least one slot.

6. The system of claim 5, further comprising:
an elastomer that over-molds the spring retainer.

7. The system of claim 5, further comprising:
a sheet of metal comprising at least one slot that is overlapped with the spring retainer such that the at least one slot in the sheet of metal does not coincide with the at least one slot of the spring retainer.

8. The system of claim 1, wherein the seal is configured to couple to a pylon of a thrust reverser.

9. The system of claim 1, wherein the spring retainer is configured to couple to a seal retainer of a thrust reverser.

10. The system of claim 1, wherein the spring retainer is configured to principally act or respond to accommodate most of a deflection caused by an opening or closing of a thrust reverser, and wherein the seal is configured to provide any additional action or response that is needed in accommodating the deflection.

11. The system of claim 1, wherein
the at least the portion of the seal configured in the shape of the bulb comprises a seal first segment and a seal second segment;
the seal first segment extends along the flexible spring retainer; and
the seal second segment is connected to the flexible spring retainer through the seal first segment, and a cavity is formed between the seal first segment and the seal second segment.

12. The system of claim 1, wherein the at least a portion of the seal configured in the shape of the bulb is located at a distal end of the cantilevered spring element.

* * * * *